No. 814,822. PATENTED MAR. 13, 1906.
S. C. ANKER-HOLTH.
JOURNAL BEARING.
APPLICATION FILED SEPT. 27, 1905.
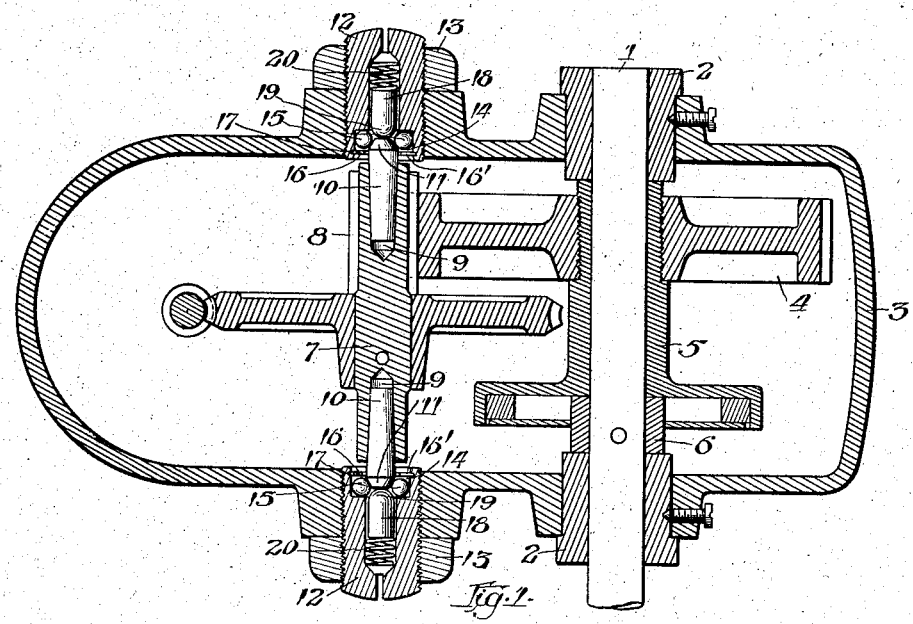
Fig. 1.
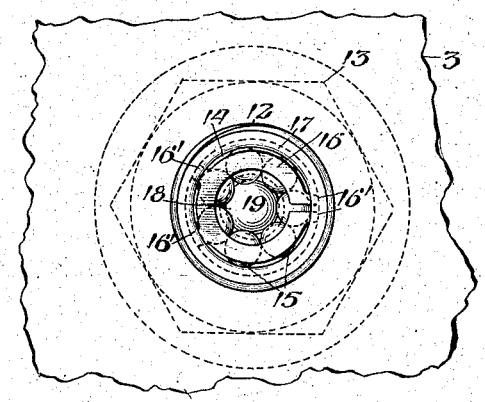
Fig. 2.
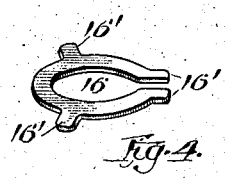
Fig. 4.
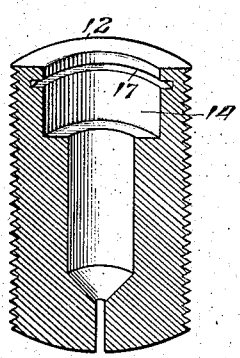
Fig. 3.
Fig. 5.
Witnesses:
T. L. Alfred
T. N. Daggett
Inventor:
Severin C. Anker-Holth
By E. W. Burgess
Attorney.

UNITED STATES PATENT OFFICE.

SEVERIN C. ANKER-HOLTH, OF RIVERSIDE, ILLINOIS, ASSIGNOR TO INTERNATIONAL HARVESTER COMPANY, A CORPORATION OF NEW JERSEY.

JOURNAL-BEARING.

No. 814,822.  Specification of Letters Patent.  Patented March 13, 1906.

Application filed September 27, 1905. Serial No. 280,272.

*To all whom it may concern:*

Be it known that I, SEVERIN C. ANKER-HOLTH, a citizen of the United States, residing at Riverside, in the county of Cook and State of Illinois, have invented certain new and useful Improvements in Journal-Bearings, of which the following is a specification, reference being had to the accompanying drawings, forming a part thereof.

My invention relates to journal-bearings, and particularly to those having balls operative to support the shaft against either longitudinal or lateral movement when applied at opposite ends thereof.

In its preferred form it consists in adjustable hollow plugs secured to a fixed part of the mechanism having counterbores at their inner ends adapted to receive the balls and having a removable split ring received by an annular channel at the head of the counterbore and adapted to retain the balls therein and a spring-pressed bolt in the hollow body of the plug having a hemisphereical head that is pressed against the balls in opposition to the retaining-ring and is operative to press the balls outward toward the side walls of the counterbore and assist in retaining them in position to receive the ends of the shaft, the object being to provide a mechanism that may be conveniently adjusted and one insuring a retention of the balls in proper position when the parts are separated. I attain this object by the mechanism illustrated by the accompanying drawings, in which—

Figure 1 represents a plan view, partly in section, of a mechanism embodying my invention. Fig. 2 is an enlarged end view of the bearing. Fig. 3 is a longitudinal cross-section of one of the adjustable hollow plugs. Fig. 4 is a perspective view of one of the split rings, and Fig. 5 is a view showing a modified form of adjustable plug having an integral retaining annular flange in place of the removable split ring.

Similar reference characters denote similar parts throughout the several views.

In the mechanism embodying my invention, 1 is a main driving-shaft journaled in removable bearings 2, secured to a gear-case 3 and having a gear member 4 and clutch members 5 and 6 mounted thereon, and 7 is a shaft having a gear member 8 secured thereto and meshing with the gear member 4 and driven thereby. The shaft 7 is preferably provided with axial longitudinal tapered bores 9, in which are fitted tapered hardened-steel spindles 10, having conical-shaped ends 11.

12 represents hollow plugs exteriorly threaded and adapted to be screwed into the walls of the gear-case 3, and 13 represents securing-nuts secured thereto. The inner ends of the plugs are provided with counterbores 14, adapted to form a race for a series of balls 15. The balls are held in contact with the end walls of the counterbores by means of split rings 16, having laterally-projecting tangs 16' beyond the peripheries thereof inserted in annular channels 17 at the inner ends of the plugs, and to hold them against the side walls of the counterbore is the purpose of the sliding bolts 18, received within the longitudinal bore of the plugs and having hemispherical inner ends 19, that are yieldingly held in contact with the balls by means of the coiled springs 20.

Fig. 5 represents a modified form of one of the adjustable plugs, wherein the balls are held in contact with the end wall of the counterbore by means of the integral annular flange 21 as a substitute for the split ring.

By means of the longitudinally-adjustable plugs the shaft mounted therein may be accurately adjusted with its gear members in either direction, and the securing-nuts operate to hold the plugs against accidental displacement.

What I claim as my invention, and desire to secure by Letters Patent, is—

1. In a journal-bearing, the combination of a shaft having conical-shaped ends, adjustable hollow plugs secured to a fixed part of the mechanism in axial alinement and having counterbores at their inner ends adapted to form a race for balls inserted therein and forming bearings for the conical ends of the shaft, retaining means at one end of the counterbore portions adapted to hold said balls in contact with the end walls thereof, and spring-pressed bolts slidingly mounted within said hollow plugs and having hemispherical ends engaging with said balls in a manner to hold them against the side walls of the counterbore portions.

2. In a journal-bearing, the combination of a shaft having conical-shaped ends, adjustable hollow plugs secured to a fixed part of the mechanism in axial alinement and having counterbores at their inner ends adapted to form a race for balls inserted therein and forming bearings for the conical ends of the shaft, said counterbore portions having annular channels at their ends, and removable rings seated in said channels and adapted to hold said balls in contact with the end walls of the counterbores, and spring-pressed bolts slidingly mounted within said hollow plugs and having hemispherical ends engaging with said balls in a manner to hold them against the side walls of the counterbore portions.

3. In a journal-bearing, the combination of a shaft having conical-shaped ends, adjustable hollow plugs secured to a fixed part of the mechanism in axial alinement and having counterbores at their inner ends adapted to form a race for balls inserted therein and forming bearings for the conical ends of the shaft, said counterbore portions having annular channels at their ends, and removable split rings seated in said channels and adapted to hold said balls in contact with the end walls of the counterbore portions, and spring-pressed bolts slidingly mounted within said hollow plugs and having hemispherical ends engaging with said balls in a manner to hold them against the side walls of the counterbore portions.

4. In a journal-bearing, the combination of a shaft having conical-shaped ends, adjustable hollow plugs secured to a fixed part of the mechanism in axial alinement and having counterbores at their inner ends adapted to form a race for balls inserted therein and forming bearings for the conical ends of the shaft, said counterbore portions having annular channels at their ends, and removable split rings having radially-projecting tangs projecting beyond the peripheries thereof and engaging with said annular channels, said rings adapted to hold said balls in contact with the end walls of the counterbore portions, and spring-pressed bolts slidingly mounted within said hollow plugs and having hemispherical ends engaging with said balls in a manner to hold them against the side walls of the counterbore portions.

5. In a journal-bearing, the combination of a shaft having conical-shaped ends, adjustable hollow plugs secured to a fixed part of the mechanism in axial alinement and having counterbores at their inner ends adapted to form a race for balls inserted therein and forming bearings for the conical ends of the shaft, retaining annular rings at one end of the counterbore portions adapted to hold said balls in contact with the end walls thereof, spring-pressed bolts slidingly mounted within said hollow plugs and having hemispherical ends engaging with said balls in a manner to hold them against the side walls of the counterbore portions, said plugs being screw-threaded upon their exterior longitudinal surfaces and having jam-nuts adjustable thereon.

6. A journal-bearing comprising, in combination, an adjustable hollow plug having a counterbore at one end adapted to form a race for balls inserted therein, said counterbore portion having an annular channel at the outer end thereof, a removable ring inserted in said channel and adapted to hold said balls in contact with the end wall of the counterbore, and a spring-pressed bolt slidingly mounted within said hollow plug and having a hemispherical end engaging with said balls in a manner to hold them against the side wall of the counterbore.

7. A journal-bearing comprising, in combination, an adjustable hollow plug screw-threaded upon its exterior longitudinal surface having a jam-nut engaging therewith, and having a counterbore at one end thereof, balls inserted in said counterbore, said counterbore having an annular channel at the end outside said balls, a removable ring inserted in said channel and adapted to hold said balls in contact with the end wall of the counterbore, and a spring-pressed bolt slidingly mounted within said hollow plug and having a hemispherical end engaging with said balls in a manner to hold them against the side wall of the counterbore.

8. A journal-bearing comprising, in combination, an adjustable hollow plug screw-threaded upon its exterior longitudinal surface having a jam-nut engaging therewith, and having a counterbore at one end thereof, balls inserted in said counterbores, said counterbores having an annular channel at the end outside said balls, a removable ring inserted in said channel and adapted to hold said balls in contact with the end wall of the counterbore, a bolt slidably mounted in said hollow plug and having a hemispherical head engaging with said balls, and a coiled spring operative between the opposite end of said bolt and the end wall of the hollow plug to hold the bolt against said balls.

In witness whereof I hereto affix my signature in presence of two witnesses.

SEVERIN C. ANKER-HOLTH.

Witnesses:
WILLIAM WEBBER,
RAY D. LEE.